(12) United States Patent
Goehlich

(10) Patent No.: US 7,361,836 B2
(45) Date of Patent: Apr. 22, 2008

(54) METHOD AND ARRANGEMENT FOR A TERMINATION OF AN ELECTRICAL CABLE

(75) Inventor: Lothar Goehlich, Berlin (DE)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 0 days.

(21) Appl. No.: 10/518,395

(22) PCT Filed: Jun. 26, 2002

(86) PCT No.: PCT/EP02/07077

§ 371 (c)(1),
(2), (4) Date: Jan. 9, 2006

(87) PCT Pub. No.: WO2004/004088

PCT Pub. Date: Jan. 8, 2004

(65) Prior Publication Data

US 2006/0124339 A1    Jun. 15, 2006

(51) Int. Cl.
*H01G 15/02* (2006.01)
(52) U.S. Cl. .................................... 174/74 R; 174/76
(58) Field of Classification Search ............... 174/36, 174/74 R, 76, 78, 79, 82, 84 R
See application file for complete search history.

(56) References Cited

U.S. PATENT DOCUMENTS

| | | | | |
|---|---|---|---|---|
| 3,446,741 A | * | 5/1969 | Hervig et al. ............... 523/223 |
| 3,758,699 A | * | 9/1973 | Lusk et al. ................... 174/19 |
| 3,796,821 A | * | 3/1974 | Lusk ........................... 174/73.1 |
| 3,876,820 A | * | 4/1975 | Mashikian .................... 174/19 |
| 4,204,083 A | * | 5/1980 | Isotton ......................... 174/9 F |
| 4,327,245 A | * | 4/1982 | Metra ........................... 174/19 |
| 4,555,588 A | * | 11/1985 | DuPont ....................... 174/73.1 |
| 4,757,159 A | * | 7/1988 | Dejean ........................ 174/73.1 |
| 4,943,685 A | * | 7/1990 | Reynaert ...................... 174/19 |
| 5,130,495 A | * | 7/1992 | Thompson .................. 174/73.1 |

(Continued)

FOREIGN PATENT DOCUMENTS

DE    1 170 846 A    *    7/2000

(Continued)

OTHER PUBLICATIONS

"Fitting Instructions for Outdoor Sealing End FE2XKVI 220 for 220-275 kV XLPE Cables with Lead Sheath (Um-245-300 kV)", Siemens AG, No. (4)J10000-X0932-N014-E, pp. 1-9, (1998).

*Primary Examiner*—William H. Mayo, III
(74) *Attorney, Agent, or Firm*—Finnegan, Henderson, Farabow, Garrett & Dunner, L.L.P.

(57) ABSTRACT

A method of building a cable termination is provided. The termination has an outer insulator body, a substantially longitudinally extended interior member having the electrical cable to be terminated, having a conductor for carrying load, an insulating material filled in a cavity between the outer insulator body and the interior member and means for accommodating volume expansions of the insulating material filled within the cavity. The cavity is created by introducing the interior member into the insulator body, filling the insulating material into the cavity and sealing the termination. A volume change compensation member having a predetermined volume to accommodate volume expansions of the insulating material within the cavity is placed into the cavity. Respective terminations are also provided.

30 Claims, 9 Drawing Sheets

U.S. PATENT DOCUMENTS

| | | | |
|---|---|---|---|
| 5,878,851 A * | 3/1999 | Carlson et al. | 188/269 |
| 6,235,992 B1 * | 5/2001 | Abisso et al. | 174/110 S |
| 6,340,794 B1 * | 1/2002 | Wandmacher et al. | 174/73.1 |
| 6,576,846 B2 * | 6/2003 | Portas et al. | 174/209 |
| 6,759,595 B2 * | 7/2004 | Goehlich et al. | 174/168 |
| 2002/0153163 A1 * | 10/2002 | Portas et al. | 174/209 |
| 2004/0129449 A1 * | 7/2004 | Boettcher et al. | 174/138 F |

FOREIGN PATENT DOCUMENTS

| | | |
|---|---|---|
| EP | 1 170 846 A1 | 1/2002 |
| FR | 1 600 999 | 9/1970 |
| GB | 1 301 993 | 1/1973 |
| GB | 2 336 252 A * | 10/1999 |
| WO | WO 96/02079 | 1/1996 |

* cited by examiner

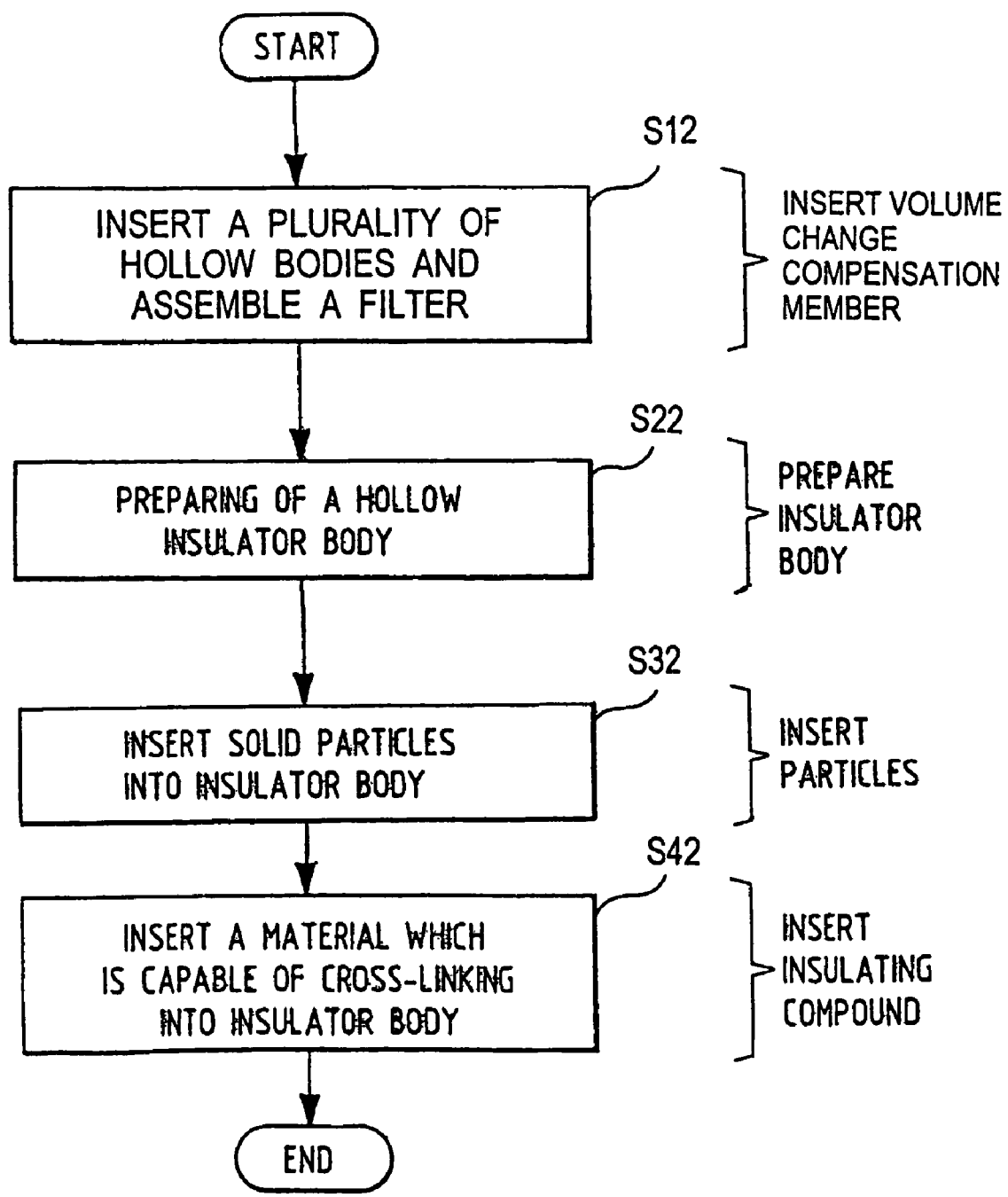

US 7,361,836 B2

METHOD AND ARRANGEMENT FOR A TERMINATION OF AN ELECTRICAL CABLE

CROSS REFERENCE TO RELATED APPLICATION

This application is a national phase application based on PCT/EP2002/007077, filed Jun. 26, 2002, the content of which is incorporated herein by reference.

FIELD OF THE INVENTION

The present invention relates to a method of building a termination of an electrical cable. In particular, the present invention relates to a method of building a termination of an electrical cable said termination comprising an outer insulator body, a substantially longitudinally extended interior member comprising the electrical cable to be terminated, the cable comprising a conductor for carrying load, an insulating material, filled in a cavity between the outer insulator body and the interior member, and means for accommodating volume expansions of the insulating material filled within the cavity, wherein the method comprising the steps of creating the cavity by introducing the interior member into the insulator body; filling in the insulating material into the cavity and sealing the termination. Additionally the present invention relates to a respective termination.

BACKGROUND OF THE INVENTION

Typically, terminations of an electrical cable, particularly high voltage outdoor terminations comprises an outer insulator body containing a cable to be terminated. The space between said cable and the interior wall of said outer insulator body being filled with an insulating material which comprises an insulating compound. Said insulating compound can be a liquid or a cross-linking insulating compound which will be described more in detail later. The liquid or cross-linking insulating compound can be filled with an insulating filler, like polyethylene pellets. Said insulating material has a thermally caused expansion, which is receptable since the termination may be exposed to temperatures ranging about 60 to 70 degree between cold winter nights and hot summer days. The increase of volume inside the insulator body requires a free space at the top of the termination. During thermally caused changes of the volume of the insulation compound the excess volume will reduce the free space at the top of the termination and thus compress the trapped air and cause an increase of pressure. Ensuring that said space on top of the termination is maintained free during the installation is rather complicated and requires a special training of the jointers. The problem of proper installation in this particular step is increased in case of conical insulators, which are used to save insulating material in electrical low stress areas close to the top of the termination.

In case said free space (i.e. the space not filled by the insulating material) is too small, a mechanical damage will occur to the insulator body at high temperatures caused by high pressures; in case the space is too large there is a risk of electrical break down because of weaker electrical strength in air than in a liquid or solid material. The general problem to be solved is to increase the quality of the termination and allow for reduction of skill of the jointer, thus leading to a more economical and safer solution.

The invention particularly addresses this problem in order to efficiently simplify the method of building a reliably insulated termination.

DESCRIPTION OF THE PRIOR ART

FIG. 1 shows a typical construction of an outdoor termination OT the building method of which is for example disclosed in EP 1 170 846 A1 as well as in "Fitting instructions for outdoor sealing end FE2XKVI 220 for 220-275 kV XLPE cables with lead sheath (Um=245-300 kV)", Siemens AG, document number (4)J10000-X0932-N014-E, which is available to customers of the respective outdoor termination.

This outdoor termination comprises an insulator body 2 having an upper plate 10 and a lower plate 11, preferably made of metal. At the upper plate 10 a conductor stalk 9 is provided with which the conductor 5.1 of a cable CA is connected. The lower plate 11 is connected to the insulator body 2 at a bottom portion thereof, for example by means of nuts and bolts 11.1.

The cable CA extends within the interior of the insulator body 2 and the cable conductor 5.1 is surrounded by an insulation 5.

At the lower portion of the insulator body 2 the cable CA is surrounded by an antikinking protection 7 to avoid a breakage of the cable. Also provided at the lower plate 11 (the base plate) there is an entrance bell 8 having a connector 20.1.

Furthermore, an electric field control means in the form of a stress cone 4 is provided at a lower portion of the insulator body 2 around the cable insulation 5 in order to appropriately set the electric field conditions inside the insulator body 2. Typically, the insulator body 2 is made of porcelain or is a composite insulator of reinforced epoxy resin and silicone sheds.

Through the entrance bell 8 by means of the connector 20.1 an insulating material 3 is injected into the interior of the insulator body 2 such that said insulating material 3 fills at least a portion of the cavity provided by the space among the interior walls 2.1 of the insulator body 2, the cable insulation 5 and the stress cone 4. Typically the outdoor termination is mounted in a substantially upright position such that an unfilled space 1 (i.e. the free space) is formed at an upper portion of the insulator body 2.

It should be noted that, depending on the range of application, the stress cone 4 may not be needed. For example, the electric field control means, i.e. the stress cone 4, may in particular be disposed if the high voltage cable CA is a DC cable and the stress control means is made of silicone carbide having an appropriate design.

The critical components of the outdoor termination OT shown in FIG. 1 are the upper and lower plates 10, 11 and in particular the insulating material 3, with respect to the liquid/gas-tightness and with respect to possible temperature fluctuations and pressure variations.

Firstly, the insulating material 3, e.g. conventionally an insulating fluid or a cross linking material, needs to possess the required dielectric properties and to be chemically neutral with respect to the material of the insulator body 2, the cable insulation 5 and the material of the stress cone 4.

Secondly, it must be considered that the outdoor termination OT is arranged in open space and is thus exposed to all kinds of environmental influences, in particular large changes in temperature and/or large stresses due to snow or wind. Temperature changes cause changes in the volumes of the insulating material 3 accompanied by pressure changes.

Even when large temperature changes occur, it must be avoided under all circumstances that a leakage occurs at the bottom part of the insulator body 2. On the other hand, when there is a large drop in temperature, particularly in case an insulating fluid is used, it must be avoided that air is sucked into the cavity 1 at the top of the insulator body 2.

EP 1 170 846 A1 discloses an outdoor termination for a high voltage cable as mentioned above, comprising an insulator body for receiving the high voltage cable and for containing an insulating material consisting of a mixture of particles (i.e. a filler) and an insulating compound, wherein said particles are solid particles without cavities. A method for making such outdoor termination for a high voltage cable comprises the steps of preparing an insulator body for receiving the high voltage cable, inserting an insulating material into the insulator body to fill at least a portion of the space between the insulator body interior walls and the cable insulation, wherein said insulating material is prepared as a mixture of an insulating compound and solid particles. According to said method in a first step said solid particles are inserted into said insulator body and in a second step said insulating compound is inserted into the insulator body, thus said solid particles and said insulating compound being mixed together. The insulating compound may be an insulating fluid or a cross-linking capable insulating material which forms a gel-like material during the cross-linking when being filled into the insulator body. The particles may for example have a grain-, pellet- or ball-like shape and the material of said particles may be polyethylene, polyvinyl chloride, rubber, glass or porcelain, for example.

The filling of the insulating material can be made by filling the solid particles into the insulator body from the top of the insulator body, for example to a certain level, e.g. filling about 90% of the interior of the insulator body such that only a predetermined space is left free at an upper portion of the insulator body. In a second step the insulating compound is inserted into the insulator body, wherein the solid particles and the insulating compound are mixed. The insulating compound is fed to the insulator body interior via a tube controlled by suitable valves.

One method to achieve said result consists in evacuating the interior of the insulator body to reach a predetermined pressure. After the vacuum has been obtained within the insulator body the insulating fluid is introduced and mixed with the solid particles already provided therein. During this process the insulating fluid is partially sucked into the insulator body, by the vacuum made inside the insulator body, and is partially pressurized by applying a pressure to the insulating fluid. According to a further method it is not necessary to use a vacuum within the insulator body and it is only necessary to pressurize the insulating fluid. According to a further method, it is also possible to use the vacuum sucking of the material and not to apply a pushing pressure to the insulating fluid, i.e. the insulating fluid is sucked into the insulator body interior merely by the vacuum pressure.

In any case it must be guaranteed that there is a good wetting of the solid particles by the insulating compound, in particular if a cross-linking insulating compound is used and that there is an appropriate displacement of air from the places between the filler particles.

The insulating compound of a so called dry-type termination is a cross-linkable polymeric material. Prior to the cross-linking, such insulating compound needs to be liquid enough to allow for easy filling into the insulator body. Accordingly, its viscosity in the non-cross-linked state should preferably not exceed 2000 mPas (Brookfield) at 23° C., preferably its viscosity is below 1500 mPas, and most preferably its viscosity is in the range of 700 to 1000 mPas. The density of such insulating compound is not subject to any particular limitation. However, usually the density is in the range of 0.95 to 1.1 g/cm$^3$ in the non-cross-linked state.

To build a termination of a cable the insulating compound may be filled into the insulator body together with a particulate material (i.e. a filler). Once such insulating compound is filled into the insulator body, it undergoes a cross-linking reaction, so as to form a soft matrix surrounding the particulate material and the cable. Accordingly, such insulating compound is a cross-linkable compound, which upon cross-linking should exhibit the necessary electric properties and be of a soft, gel-like consistency. The softness of such cross-linked insulating compound is desirable, as it allows for the compensation of mechanical stress on the insulating filling.

Typically, the insulating compound upon cross-linking and in the absence of the particulate material may have a hardness according to DIN ISO 2137 of 200 to 500 mm/10, preferably 250 to 400, and most preferably 290 to 350 mm/10. Very good results have been obtained with insulating compounds which exhibit a hardness upon cross-linking of 310 to 350 mm/10. After the cross linking the viscosity of the insulating compound under all operating conditions, e.g. from −40° to 100° C., is preferably such that it can be permanently contained in the insulator body without necessitating gas- or liquid-tight seals. In other words, the cross linked insulating compound forms a soft but solid body.

In order to further reduce mechanical stress, it is also desirable that the thermal conductivity of the insulating compound at 20 to 150° C. according to DIN 52612 is in the range of 0.15 W/mK to 0.3 W/mK, particulary preferred are thermal conductivities around 0.2 W/mK. For the same reason it is also preferred that the coefficient of linear expansion of such insulating compound in the cross-linked state is small, i.e. in the range of 200×10-6 m/mK to 400×10-6 m/mK, preferably between 300×10-6 m/mK and 350 m/mK.

In terms of the electrical properties, the dielectric strength of such insulating compound (1 mm sheet, IEC 243-2) is in the range of 18 to 30 kV/mm. Values between 20 and 25 KV/mm and in particular values around 23±10% KV/mm are preferred. The volume resistivity measured at 23° C. according to DIN IEC 93 is preferably-in the range of 5×1015 to 5×10-16 Ωcm. Very good results have been obtained with insulating compounds having a volume resistivity of 1016±10% Ω. It is also preferably that the relative permittivity of such type of insulating compound upon cross linking (VDE 030 T4, 50 Hz) is between 2.5 to 3, preferably between 2.7 and 2.9. Insulating compounds of the above type can be of diverse chemical structure. The common denominator is that they are capable of being cured in the insulator body and satisfy the above requirements particularly in regard to the softness. The curing may thereby be effected according to various methods known in the art. However, addition curing processes that proceed at ambient temperature are preferred.

Preferred insulating compounds for dry-type cable terminations are modified hydrocarbons, such as polybutadiene, modified polyolefins and silicone polymers.

Under such conditions, i.e. by using such known methods of building a termination of a cable end, the applicant perceived that it is quite complicated to ensure that a free space is maintained on top of the termination during the installation, said space being necessary for accommodating volume changes of the insulating material inside the termination.

In case the filling of the insulating material into the termination is carried out by taking into account a filling mark possessed by the insulator body, an appropriate displacement of the air between the solid particles can not be guaranteed above all if the viscosity of the insulating compound is high, therefore an incorrect filling of the insulator body can occur. Additionally, said filling step is time consuming (it may take about an hour) and is a source of unwanted errors.

The above-mentioned document "Fitting instructions for outdoor sealing end FE2XKVI 220 for 220-275 kV XLPE cables with lead sheath (Um=245-300 kV)", Siemens AG, document number (4)J10000-X0932-N014-E on sheets 8 and 9 discloses that in order to fill the termination with an insulating material the amount of said material has to be fixed before filling and to be selected depending on the material temperature and an average ambient temperature, i.e. the average ambient temperature of the place of use of that termination. Such method is also quite complicated.

The applicant has found that, during installation, a free space inside the termination can be advantageously maintained by introducing a member whose predetermined volume corresponds to the desired volume of free space to be maintained.

SUMMARY OF THE INVENTION

As explained above, it is an object of the present invention to increase the reliability of a termination allowing for reduction of skill of the jointer, thus leading to a more economical and safer solution.

According to one aspect of the present invention this object is solved by a method of building a termination of an electrical cable said termination comprising an outer insulator body, a substantially longitudinally extended interior member comprising the electrical cable to be terminated, said cable comprising a conductor for carrying load, an insulating material, filled in a cavity between the outer insulator body and the interior member, and means for accommodating volume expansions of the insulating material filled within the cavity. The method comprises the steps of: creating the cavity by introducing the interior member into the insulator body; filling in the insulating material into the cavity and sealing the termination. According to the present invention a volume change compensation member having a predetermined volume to accommodate volume expansions of the insulating material within the cavity is placed into the cavity.

Thus, the jointer fills the cavity between the outer member and the interior member of the termination with the insulating compound, possibly after introducing thereinto an insulating filler (like solid particles). It is not necessary to ensure any free space on top of the termination during the process step of introducing the insulating compound since the volume change compensation member accommodates volume expansions of the insulating material within the cavity.

The insulating material, to be introduced into said cavity, can comprise a liquid insulating material (like silicone oil or transformer oil), or an insulating cross-linking compound (like a silicone based insulating compound) and a pourable solid insulating material (e.g. an insulating filler like for example solid granules made of a polymeric material as polyethylene, polypropylene, ethylene-propylene rubber or silicone rubber or beads of glass, ceramic, porcelain or epoxy resin, which may be for example approximately spherical, approximately cylindrical or irregular in shape).

Preferably, according to the present invention, the step of placing the volume change compensation member into the cavity is performed before the step of filling in the insulating material.

Preferably said volume change compensation member comprises at least two parts which may enable an easier installation thereof and, if foreseen, an easier removal of such volume change compensation member.

According to one particular embodiment of the present invention, the method of building a termination of an electrical cable further comprises the step of selecting the predetermined volume of the volume change compensation member depending on the temperature of the insulating material. With such additional step the predetermined volume of the volume change compensation member can be more exactly selected to accommodate volume expansions of the insulating material filled in the cavity and thus the reliability of the termination can be increased.

According to one particular embodiment of the present invention, the method of building a termination of an electrical cable further comprises the step of selecting the predetermined volume of the volume change compensation member depending on the ambient temperature range of the area where such termination will be installed. Therefore, the selection criterion may be an average value of the expected ambient temperature of the termination, for example. With such additional step the predetermined volume of the volume change compensation member can be more exactly selected to accommodate volume expansions of the insulating material filled into the cavity and thus the reliability of the termination can be increased.

According to a further embodiment of the present invention, the method of building a termination of an electrical cable further comprises the step of removing the volume change compensation member after the step of filling said insulating material into the cavity.

According to a second aspect, the present invention concerns a termination of an electrical cable comprising an outer insulator body member, a substantially longitudinally extended interior member comprising said electrical cable to be terminated, said cable comprising a conductor for carrying load; an insulating material, filled in a cavity between said outer member and said interior member, and means for accommodating volume expansions of said insulating material filled in said cavity.

According to the present invention said means for accommodating the volume expansions of said insulating material comprises a volume change compensation member having a predetermined volume to ensure the accommodation of said volume expansions of said insulating material within said cavity.

Said volume change compensation member according to the present invention is shaped to fit in the cavity of said termination.

Preferably the volume change compensation member is a compressible member which compensates the volume expansions of the insulating material by changing its own volume.

According to one preferred embodiment of the present invention said volume change compensation member is a solid body.

Such a solid body may be a cylinder made of any material, preferably of plastic. Its outer diameter may preferably be a little bit smaller than the inner diameter of the outer insulator body. Preferably the gap between said outer diameter and said inner diameter of the outer insulator body ranges from 2 to 10 mm. Such cylinder has a bore, with a diameter a little bit larger than the outer diameter of the cable core, preferable 2 to 10 mm, in the upper part of the termination. The design of such solid body can be modified if a sealing member is present which seals the conductor stalk at the upper end of the termination when fit for use.

The solid body will be installed in the interior at the top of the termination during filling of the fluid and removed after the filling process will be completed. To facilitate this, the solid body can consist of two parts.

The solid body can be covered with a transparent plate to watch the rising fluid level visually from the top.

In one preferred embodiment, such solid body is fixed at a plate which covers the termination during the fitting process. Also such plate for closing the top end of the termination during the filling process, which plate has a member extending into the cavity between the outer member and the interior member of the termination, preferably is at least partly transparent to allow a jointing person watching the filling status of the termination.

A solid body as a volume change compensation member can be used for all types of cylindrical terminations, with a fluid or cross linking compound to be filled, with or without any insulating filler.

A solid body as a volume change compensation member can be reused therewith saving mounting costs.

According to a further preferred embodiment of the present invention, the volume change compensation member is a foam body.

Such a foam body may be a cylinder, a cone or even a plate, which will be able to fill the space in the upper part of the termination. The shape of such volume change compensation member depends on the shape of the gap between the outer insulator body and the interior member.

In case of a cylindrical outer insulator body, the foam body design itself may be a cylinder with an outer diameter similar to the inner diameter of the insulator body. The foam body may have an opening like a bore with an inner diameter similar to the outer diameter of the cable core.

In case of a conical outer insulator body, the foam body may be a cone with a bore. A plate with a special shape, which will form a cone and which will be able to fill the respective space at the top of the interior of the termination with a conical insulator body, can be used as volume change compensation member as well.

The material of the foam body may preferably be a closed cell foam material. The preferable hardness depends on the installation method. If the foam body has to be pulled off after installation, the foam body can be harder; if the foam body remains in the termination, the foam body can be softer.

The foam material may be either electrically insulating or semi-conductive.

In one particular embodiment of the present invention the foam material of the volume change compensation member can contain encapsulated chemicals, which encapsulation breaks at mechanical stress and which chemicals will destroy the foam skeleton. People skilled in the art of foam materials will appreciate which type of chemicals are useable for that purpose and how to encapsulate them inside the foam material. Since that part of this particular embodiment is not in the main focus of the present invention, a detailed description will be omitted herein.

Furthermore the foam material may contain water absorbing materials in order to absorb humidity, trapped during installation in respective environmental climate or in case of a broken gasket.

Such a volume change compensation member comprising a foam body will be installed in the interior at the top of the termination during filling of the insulating material and removed or be remained after completed filling process.

During the step of filling the insulating material into the termination, also such foam body can be covered with a transparent plate to watch the rising fluid level visually from the top of the termination.

Such a foam body can be used as a volume change compensation member for all types of cylindrical and conical terminations, with fluid or cross linking compound to be filled, with or without any additional insulating filler, respectively.

According to a further preferred embodiment, the volume change compensation member comprises a hollow body.

Such a hollow body as a volume change compensation member preferably may consist of a multiplicity of small compressible elements, like balls, each element consisting of a solid skin and a compressible interior space, which is tightened by the skin. This interior space can be filled with air or gas. The material and design of the skin depends on the insulating compound which surrounds said compressible elements. Diffusion of trapped gas from the interior of said elements into the surrounding insulating compound should be avoided or limited to a minimum extend. Thus elements made of metal, plastic or rubber covered with metal or special plastics will preferably be used for insulating fluid and plastic and rubber will preferably be used for insulating cross linking compound. The plastic material can be either insulating or semi-conducting.

In order to avoid diffusion of interior gas of said elements into the surrounding insulation compound, in one preferred embodiment of the invention said gas is sulphur hexafluoride or a so called "security tire gas" or "long live gas" as used to inflate tires.

The diameter of the compressible elements may be for example in a range between 5 to 20 mm. Preferably the wall thickness can be in the range from 0.01 mm to 1 mm.

Preferably the shape of said compressible elements may be ball-like or flattened, like a discus. To allow for a more flexible motion of the skin, the shape of said elements may be wavy so that the skin works like a diaphragm.

A multiplicity of said compressible elements can be placed either on top or bottom of the termination, depending on the material of said elements and on the design of the termination and will remain after filling up with the insulating compound. The reason for that is primarily that the electrical field strength distribution will be less negative effected by such compressible elements on top or bottom of the termination than in the area between top and bottom, i.e. in the area around the stress cone.

The total volume of said compressible elements has to be adequate to the required volume of the free space.

Such compressible elements can be used as a volume change compensation member according to the invention for all types of insulator bodies, cylindrical or conical.

According to still a further preferred embodiment the volume change compensation member is an inflatable body.

Such an inflatable body may be cylindrical or frusto-conical in shape, it is hollow and presents a bore for receiving the interior member of the termination. The outer skin of such inflatable body can be made of flexible plastic or rubber which can be blown up with air or gas. Preferably, its outer diameter is smaller and the inner diameter is larger than the respective diameters of the outer insulating body and the interior member. Thus the inflatable body can be placed in the space between the insulator body and the cable core. In case, such inflatable body will remain inside the termination after filling, i.e. under conditions of normal usage, the size of such inflatable body will be depending on the ability of such body to increase its volume.

Preferably the inflatable body is filled with air or gas up to a pressure between 0,1 bar and 0,5 bar, thus the volume of the inflated body is equal to the required space. For example, the filling process for inflating such body may be performed by means of a valve in the body.

After pre-installation of such inflatable body as a volume change compensation member the termination can either be closed temporarily or sealed with the upper plate, depending on the further installation sequence, i.e. to remove or to keep the inflatable body in the termination for final electrical operation.

In one preferred embodiment of the present invention, in case the inflated body remains in the termination, it may consist of semi-conductive material and improve the distribution of electrical field. The electrical contact to high voltage potential may be simply made by compression to the bare conductor stalk in order to ensure the electrical potential of the conductor stalk also at the surface of the inflatable body. In case of a conducting or semi-conducting volume change compensation member shall not be formed comprising any protrusions or other portions of high field strength concentrations.

Further advantageous embodiments and improvements of the invention are listed in the dependent claims appending to the description. Furthermore, it should be noted that the disclosure presented herein only lists the preferred mode of the invention and should not be understood as limiting in any way. That is, a skilled person can carry out modifications and variations of the invention on the basis of the teaching of the present specification. In particular, the invention can comprise embodiments which result from an individual combination of features which have been described separately in the description and the claims.

BRIEF DESCRIPTION OF THE DRAWINGS

In the drawings the same reference numbers indicate the same parts throughout the specification.

FIG. 11 shows a schematic flow chart of a third exemplary embodiment of a method of building a termination of an electrical cable in accordance with the present invention.

Hereinafter, preferred modes of the invention will be described. However, it should be understood that other modifications and variations of the invention are possible on the basis of the teachings herein.

FIRST EMBODIMENT OF A TERMINATION

Figure 2:
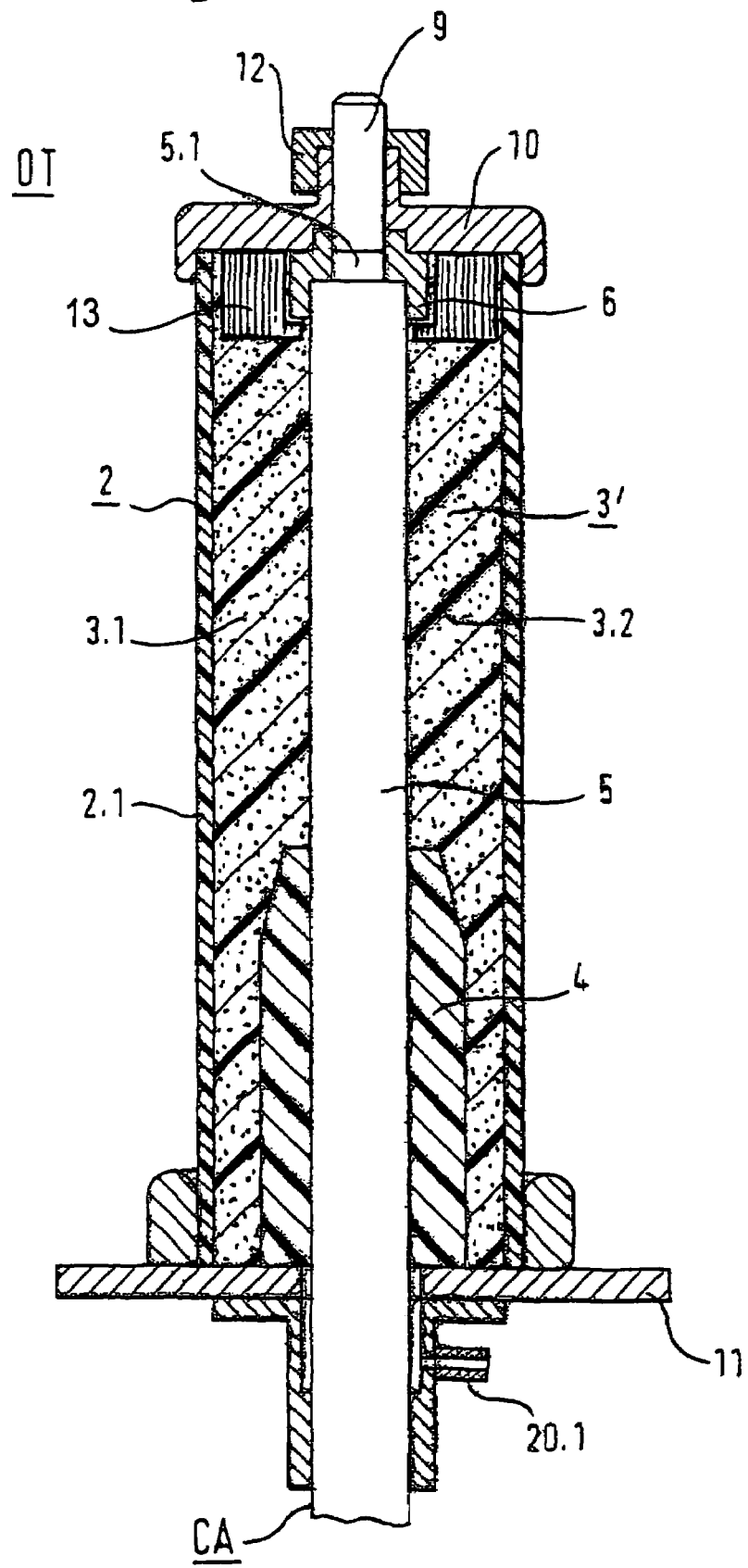
FIG. 2 schematically shows a first exemplary embodiment of a termination of an electrical cable in accordance with the present invention, using a solid body as a volume change compensation member.

FIG. 2 shows a first embodiment of a termination according to the present invention.

In particular FIG. 2 shows an outdoor termination OT which comprises, as described above, an insulator body 2, an upper plate 10, a lower plate 11, a conductor stalk 9 and an electric field control means 4 in the form of a stress cone 4. The insulator body 2 is tubular in shape and reference sign 2.1 indicates the interior wall of said body 2. At the upper end of the insulator body 2 a volume change compensation member 13 in the form of a pre-manufactured solid body is provided, in the status as shown almost filling a space mentioned as an unfilled space 1 in FIG. 1 above. After removal of the volume change compensation member 13, a cavity will be left.

It should be noted that in embodiments of the invention the stress cone 4 is needed, if the high voltage cable CA is an AC cable but may be omitted in some other cases. For example, the electric field control means, i.e. the stress cone 4, may in particular not be needed if the high voltage cable CA is a DC cable. Preferably a stress control means other than a stress cone is made of silicone carbide.

Furthermore, the outdoor termination OT in FIG. 2 comprises a sealing element 6 and upper fixing means 12, e.g. a nut.

The upper plate 10 at the top of the termination preferably is a transparent plate for controlling the step of filling the insulator body 2. Preferably, said upper plate 10 is not tightly associated to the insulator body 2 in order to allow for removing of air during the filling process.

The insulator body 2 receives the high voltage cable CA as well as an insulating material 3, which fills at least a portion of the space between the insulator body interior wall 2.1 and the cable insulation 5 such that a cavity 1 is formed at the upper portion of the insulator body 2 where the connection between the cable conductor 5.1 and the conductor stalk 9 is made. As schematically shown in FIG. 2, the insulating material 3 consists of a mixture of solid insulating particles 3.1 and an insulating compound 3.2. The insulator body 2 is made of an electrically insulating material, for example porcelain.

Preferred materials for the solid insulating particles 3.1 are, for example polyethylene, polyvinylchloride (PVC), rubber, glass or porcelain.

Generally the solid insulating particles 3.1 are not hollow. Preferably the solid insulating particles 3.1 are free of inclusions of any foreign matter. Preferably, the solid insulating particles are grain-like, pellet-like or ball-like shaped particles having a diameter preferably between 1 to 5 mm.

Preferably, the insulating compound 3.2 is an insulating cross linking compound or an insulating fluid. Said insulating fluid can be an organic or synthetic fluid and is to be filled into the termination via an connector 20.1, shown at the lower part of the termination of FIG. 2.

Preferably, the specific gravity of the particles 3.1 is substantially equal or greater than the specific gravity of the insulating fluid 3.2. In a particular embodiment of the invention shown in FIG. 2, the insulating compound 3.2 is a cross-linkable insulating fluid which is in a liquid-state when it is inserted into the insulator body 2 and cross-links after the insertion into the insulator body, which has already been filled with the solid particles. Said cross-linkable insulating fluid forms a resin of a gel-like consistency after the cross-linking.

The cross-linking is such that the material forms a matrix which is cross-linked and spreads (wets) the solid particles 3.1 and preferably also the insulator body interior walls 2.1 and the cable insulation 5. That is, the cross-linking capable material, after being filled in the insulator body interior as a liquid, undergoes a cross-linking reaction.

Preferably, the material also performs a spreading (e.g. wetting) of the interior walls 2.1, of the cable insulation 5 and, if provided, of the stress cone surface 4. Thus, due to the spreading, the cross-linked material somewhat adheres to the interior surface 2.1, the cable insulation 5 and possibly the stress cone surface 4. However, when temperature changes occur, which cause the cross-linked material to more, the cross-linked material should be released from the respective surface so as to relieve the mechanical stress.

It is also possible that the material in the course of the cross-linking reaction also forms chemical bonds with the particles 3.1 and preferably also with the interior walls 2.1, the cable insulation 5 and the stress cone surface 4 (if provided).

After the cross linking, the viscosity of the cross-linked insulating fluid is so large that permanent seals in particular in the lower portion of the insulator body 2 can be disposed with or the sealing construction can at least be made simpler by contrast to the conventional outdoor terminations. There is no necessity for an absolute sealing at the lower portion. For example, the seals must only provide a temporary sealing function as long as the insulating fluid has not been fully cross-linked with the particles or preferably also with the interior walls and the cable insulation.

The volume change compensation member 13 keeps the particles 3.1 in place even if they try to swim up because of their smaller density with respect to the liquid insulating compound 3.2

The upper plate 10 and the volume change compensation member 13 can be designed in one part.

After the filling step is completed, the volume change compensation member 13 is removed and the termination is sealed with the upper plate 10.

SECOND EMBODIMENT OF A TERMINATION

Now a second embodiment of a termination according to the present invention will be described referring to FIG. 3 to 5.

Figure 3:
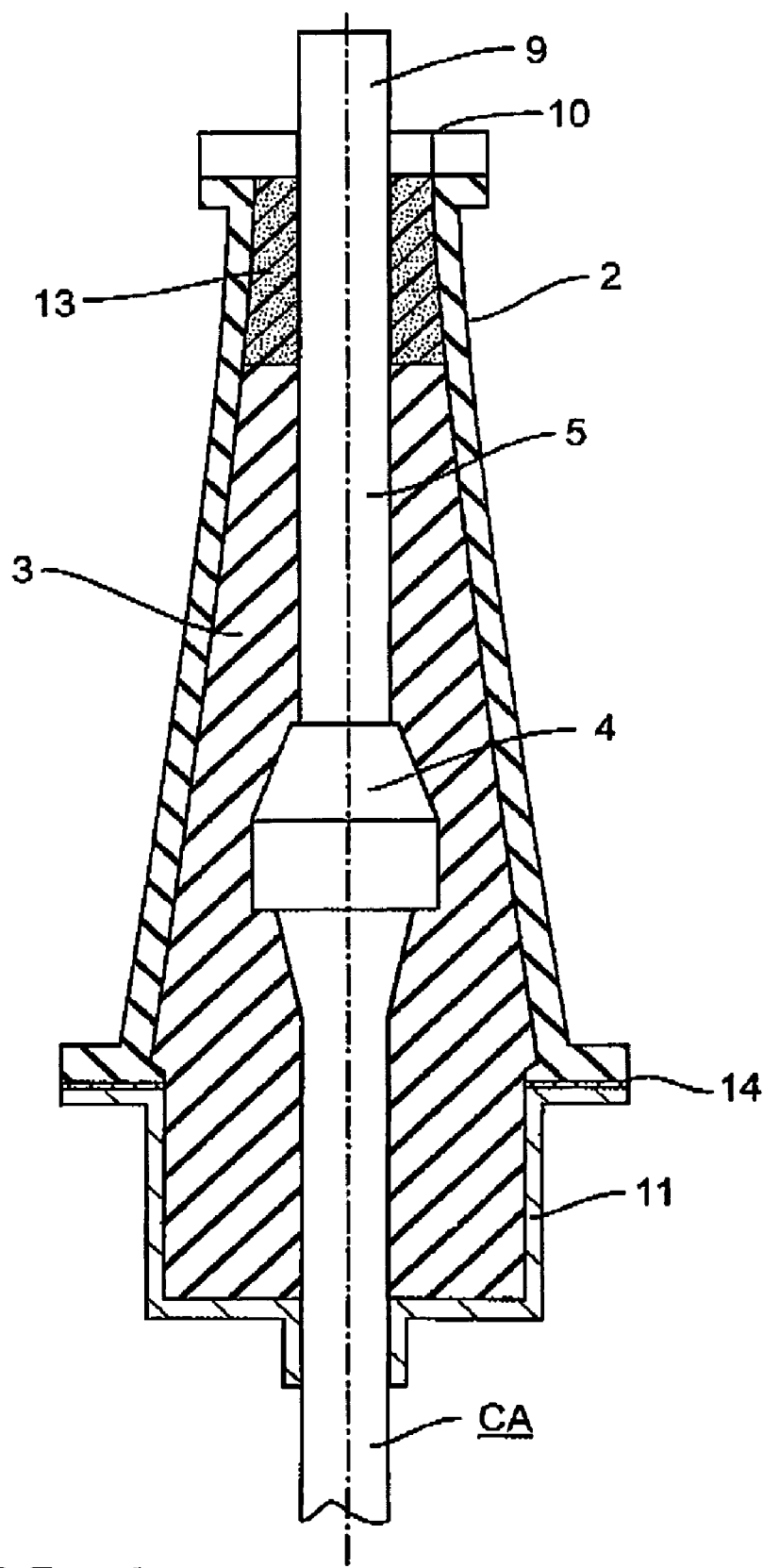
FIG. 3 schematically shows a second exemplary embodiment of a termination of an electrical cable in accordance with the present invention, using a foam body as a volume change compensation member.

FIG. 3 shows a second embodiment of a termination according to the present invention.

In particular FIG. 3 shows a termination OT of a cable CA, said termination being provided with a volume change compensation member 13 in the form of a pre-manufactured foam body.

The termination is filled with the insulating material 3 mentioned above, for example via a connector, not shown in FIG. 3.

Except for the type of volume change compensation member 13, the main difference between the termination according to FIG. 2 and that according to FIG. 3 is the shape of the insulator body. According to said second embodiment a conical insulator body 2 is shown, an upper plate 10, a lower plate 11 coupled with the insulator body 2 via a gasket 14, a conductor stalk 9 and an electric field control means 4 in the form of a stress cone 4. The free space inside the insulator body 2 is filled with an insulating compound 3. The volume change compensation member 13 in the form of a foam body is positioned at the top of the termination, in correspondence of the upper plate 10. The volume change compensation member 13 remains in the termination during operation so that, in case of thermally caused expansion of the insulating material, the foam body is compressed.

According to a further embodiment, the volume change compensation member 13 is taken out from the termination after the step of filling the insulating material into the insulator body 2 is completed.

THIRD EMBODIMENT OF A TERMINATION

Figure 4:
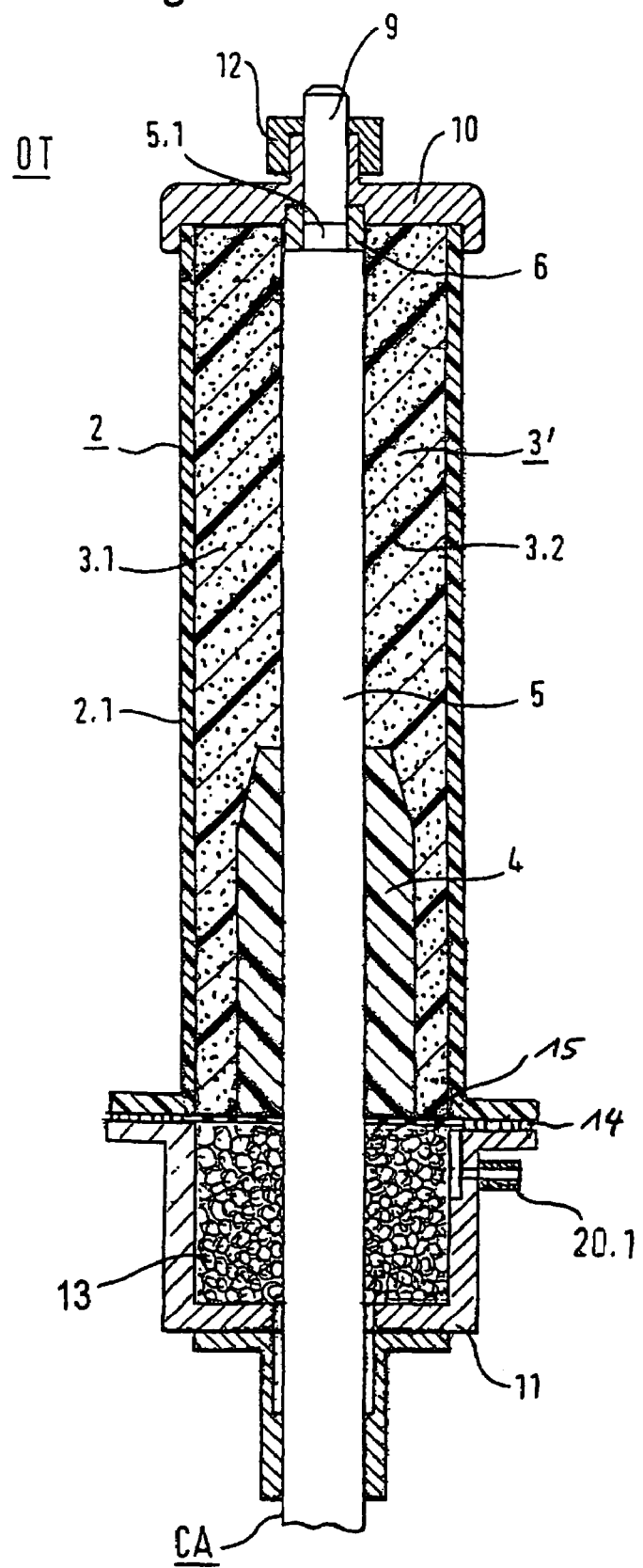
FIG. 4 schematically shows a third exemplary embodiment of a termination of an electrical cable in accordance with the present invention, using a plurality of compressible elements as a volume change compensation member.

FIG. 4 shows a third embodiment of a termination according to the present invention.

In particular FIG. 4 shows an outdoor termination OT comprising a lower plate 11 in the form of a tubular body which receives the high voltage cable CA at its lower end and has an opening at its upper end in correspondence with the insulator body 2. A volume change compensation member 13 in the form of compressible bodies is provided in the bottom of the termination inside of the tubular lower plate 11. Said compressible bodies are covered with a cover member 15 in order to prevent swimming-up of said compressible bodies when the insulating fluid 3.2 is filled into the termination. The lower plate 11 is coupled to the insulator body 2 and sealed by a gasket 14. Preferably, said compressible bodies are hollow.

In case polyethylene pellets are used as insulating solid particles 3.1 of the insulating material 3 the cover member 15 is not necessary and can be omitted as far as this polyethylene pellets prevent said compressible bodies from movement out of the area of non-critical electrical field. It is necessary to fill in the compressible bodies before filling in the solid insulating particles 3.1 to ensure that the compressible bodies are kept in the area of non-critical electrical field at the bottom of the termination.

In case of thermally caused expansion of the insulating compound the compressible bodies in the bottom area of the termination will be compressed, herewith compensating excess volume of the expanded insulating material 3.

According to a further embodiment (not shown), compressible bodies are provided at the top of the solid insulating particles 3.1 in the upper part of the termination. In such particular case, however, it is necessary to fill in the compressible bodies after the solid insulating particles 3.1 to ensure that the compressible bodies are in the area of non-critical electrical field at the upper part of the termination.

Figure 5:
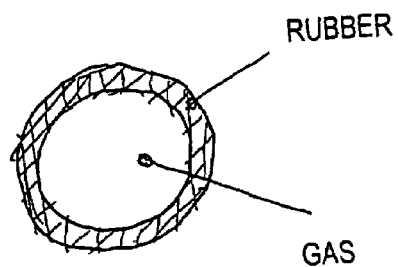
FIG. 5 to 7 schematically show cross sectional views of the shape of possible embodiments of different compressible elements, which can be used in the third embodiment of a termination of an electrical cable, as shown in FIG. 4.
Figure 6:
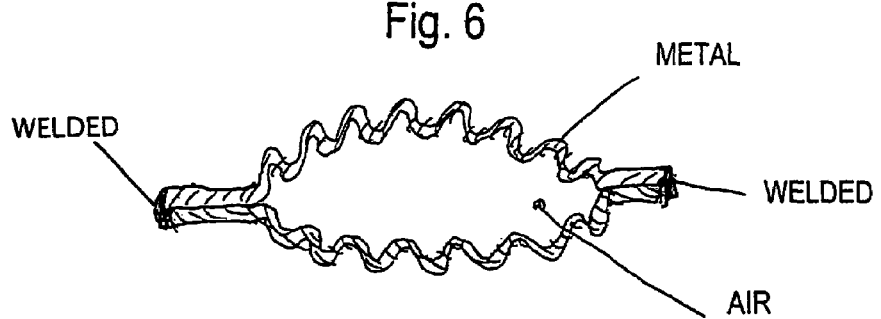
Figure 7:
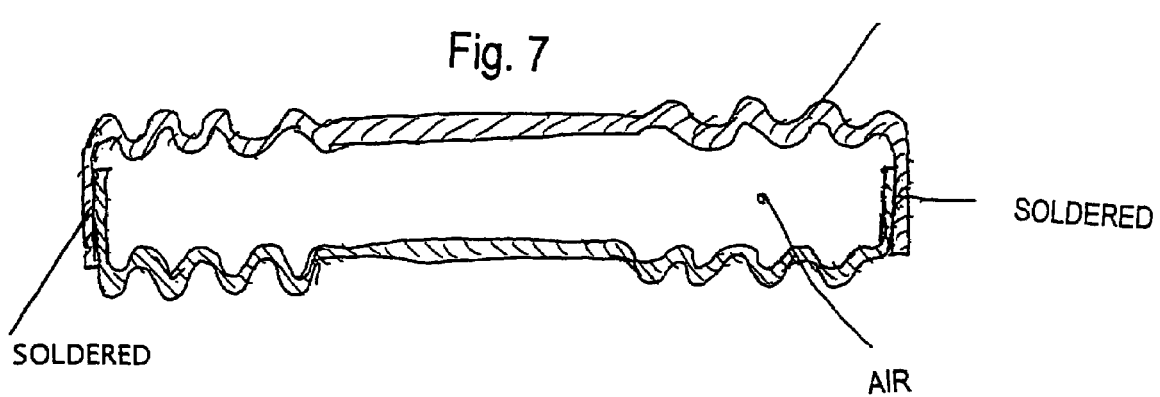

FIGS. 5, 6 and 7 show different compressible hollow bodies according to particular designs.

FIG. 5 shows a cross sectional view of a ball shaped hollow body made of rubber and filled with a gas. Preferably the pressure inside said hollow body is the atmospheric pressure. The diameter of this ball shaped body is for example 15 mm and the wall thickness is for example 1 mm. Said ball shaped body can be deformed to any shape by the outer pressure, when the latter increases, and relax as well.

FIG. 6 shows a cross sectional view of a shell shaped hollow body made of metal. Two plates with waved structure are welded together and air is trapped inside thereof.

The diameter of said body is preferably 20 mm; the wall thickness is preferably 0.05 mm.

FIG. 7 shows a cross sectional view of an embodiment similar to that shown in FIG. 6, each of the two plates being provided with two waved portions welded together at their respective ends.

FOURTH EMBODIMENT OF A TERMINATION

Figure 8:
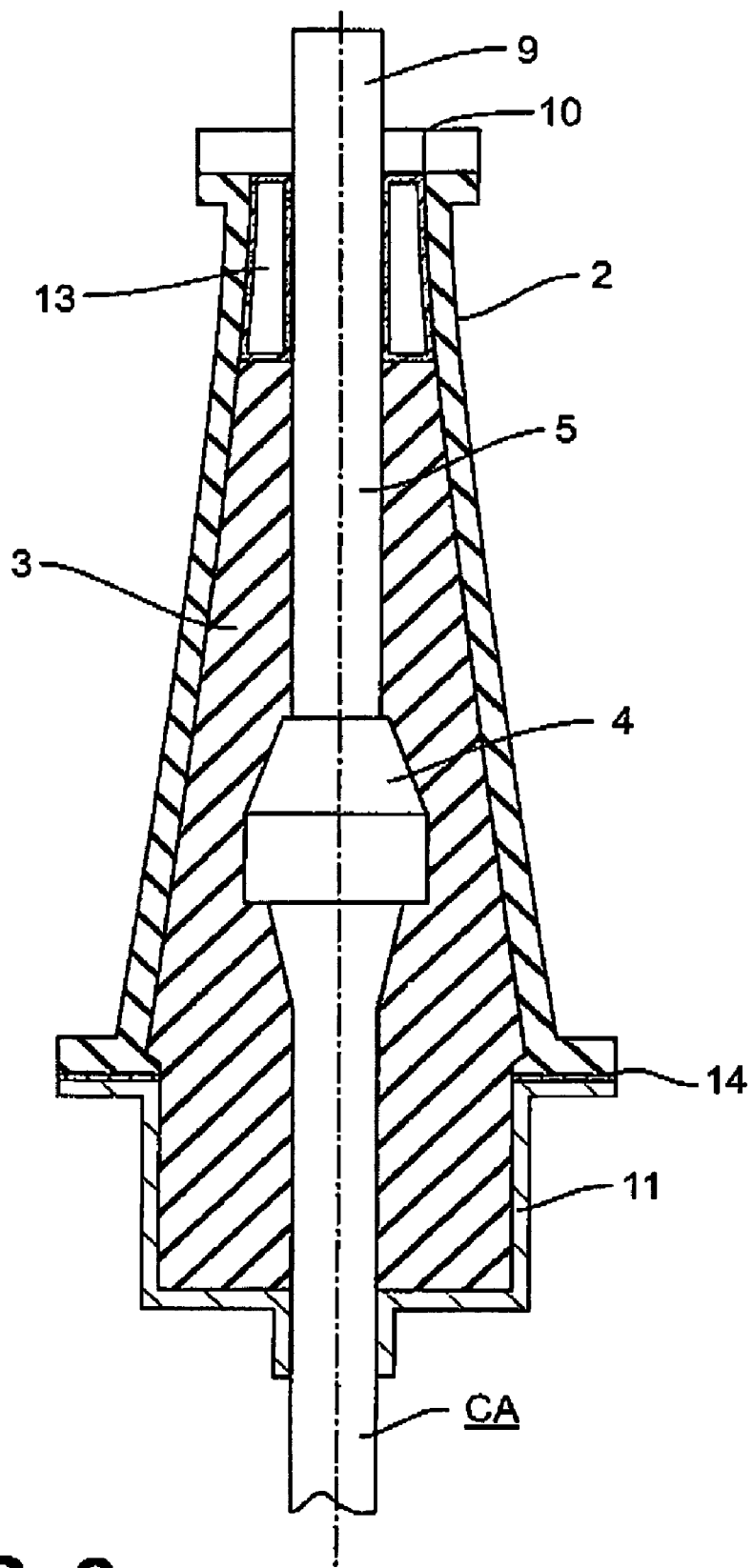
FIG. 8 schematically shows a fourth exemplary embodiment of a termination of an electrical cable in accordance with the present invention, using an inflatable body as a volume change compensation member.

FIG. 8 shows a forth embodiment of a termination according to the present invention.

In particular FIG. 8 shows a volume change compensation member 13 on top of a termination provided with a conical insulator body 2. Said volume change compensation member is in the form of an inflatable body, shown already inflated in FIG. 8

According to FIG. 8, the volume change compensation member 13 is shown positioned at the top of the termination, while the insulator body 2 is already filled with the insulating material 3 and the upper plate 10 is installed.

The height of the inflatable body is chosen to occupy the necessary volume at the atmospheric pressure. The pressure within the inflated body, generated for example by a suitable pump is for example of about 0,5 bar and the body increases its volume.

In this particular embodiment the material of the inflatable body is a semi-conductive rubber and the inflatable body improves the electrical strength of the termination.

In the inflated condition the body can prevent the solid particles of the insulating material from swimming up during the filling process. The insulating compounds, e.g. silicone gel, is filled in at a pressure adequate to the pressure in the body and the body is then compressed to its size at atmospheric pressure by means of the pressure balance in the termination. In case of a temperature rise of the termination the insulating compound 3 will expand and the inflated body will be compressed. In case the temperature drops below installation temperature the insulation compound will shrink. In this case the inflated body will expand and compress the insulating compound until the pressure in the inflated body is in balance with the pressure inside the termination. This property of the inflatable body will allow a close contact of the insulating compound 3 to the inner surface of the insulator body 2 under all conditions.

FIRST EMBODIMENT OF A METHOD TO BUILD A TERMINATION

Figure 9:
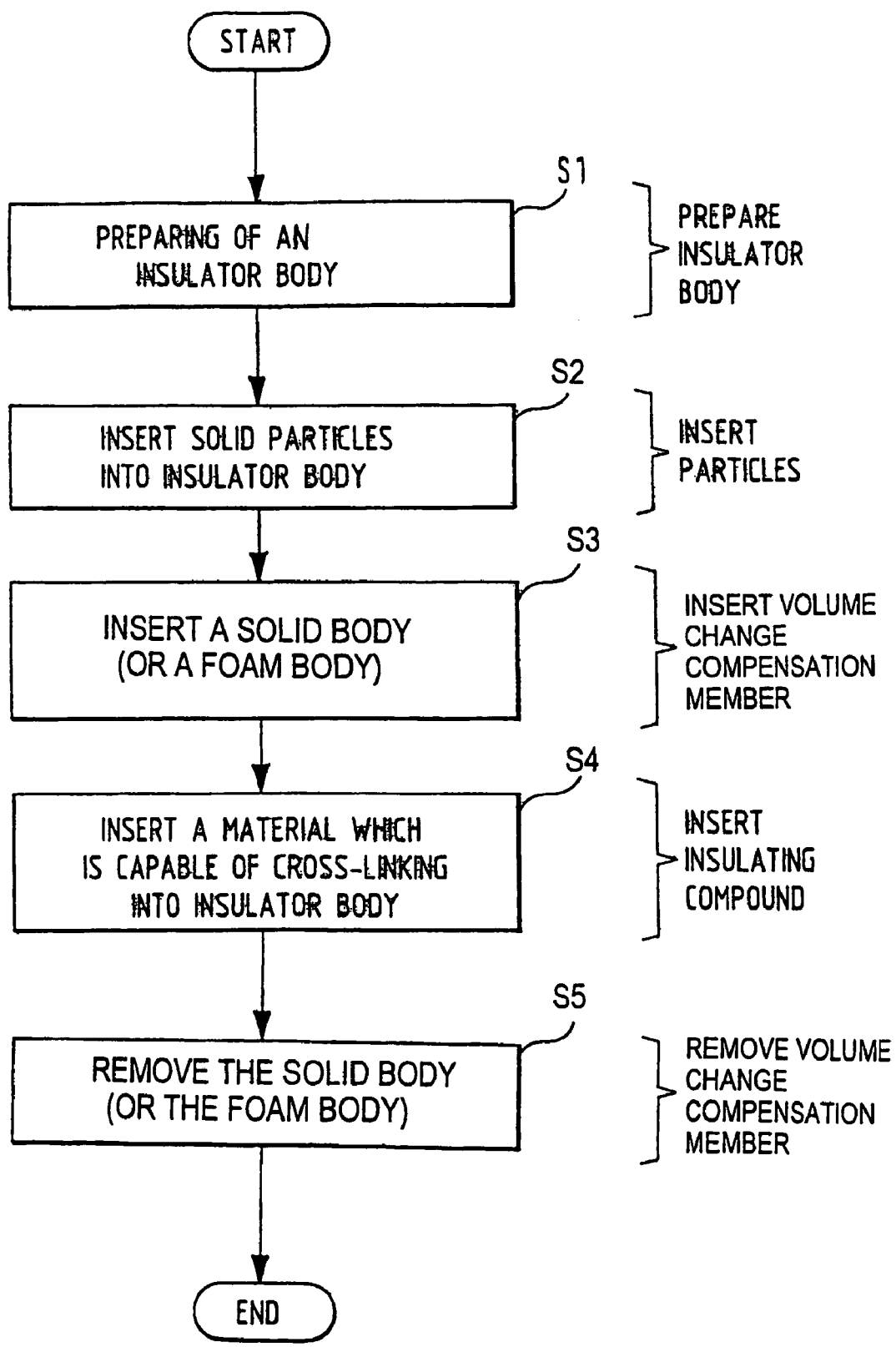
FIG. 9 shows a schematic flow chart of a first exemplary embodiment of a method of building a termination of an electrical cable in accordance with the present invention.

FIG. 9 shows a first embodiment of the method of building a termination of an electrical cable in accordance with the invention.

Particularly FIG. 9 shows a first embodiment of the method of building a first embodiment of the termination as described above with reference to FIG. 2. However, this first embodiment of the method of building a termination is also applicable to the modification of the second embodiment of a termination as described above with reference to FIG. 3, in which the volume change compensation member 13 in the form of a foam body is taken out from the termination when the step of filling the insulating compound is completed.

Figure 1:
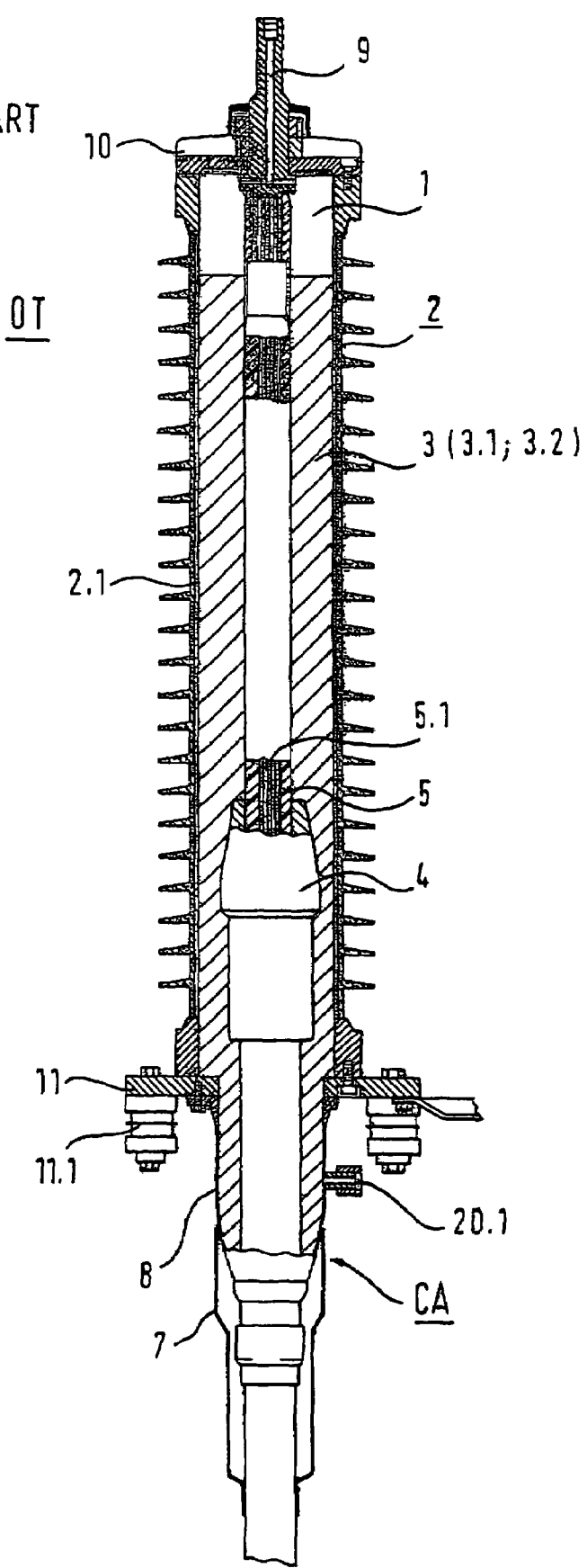
FIG. 1 shows a typical construction of an outdoor termination according to the prior art.

The procedure starts at step S1, in which an insulator body 2, with the parts as shown in FIG. 1 and FIG. 2 necessary for the electrical functioning of the outdoor termination, is prepared and a high voltage cable CA is provided inside said insulator body 2.

In a second step S2, solid particles 3.1 are filled into the insulator body 2 from the upper portion of the termination. For example a filling of about 90% of the interior of the insulator body 2 is carried out and a predetermined space is left free at the upper portion of the insulator body 2. In case the insulating material does not foresee a solid filler, i.e. the solid particles, this step is omitted.

In a third step S3, a volume change compensation member 13 is introduced into the insulator body 2 from above, occupying a certain volume of the upper portion of the insulator body 2, and the termination is closed at its upper end, for example by an upper plate 10.

In a fourth step S4, the insulating compound 3.2 is filled into the insulator body 2 via the connector 20.1 until the inner space of the termination is approximately totally filled.

In a fifth step S5, the volume change compensation member is removed from the upper portion of the termination leaving a certain volume of air at the upper portion of the insulator body 2. Then the termination is closed at its upper end by the upper plate 10.

Said procedure may also be applied with a volume change compensation member 13 in the form of an inflatable body instead of a solid body.

SECOND EMBODIMENT OF A METHOD TO BUILD A TERMINATION

Figure 10:
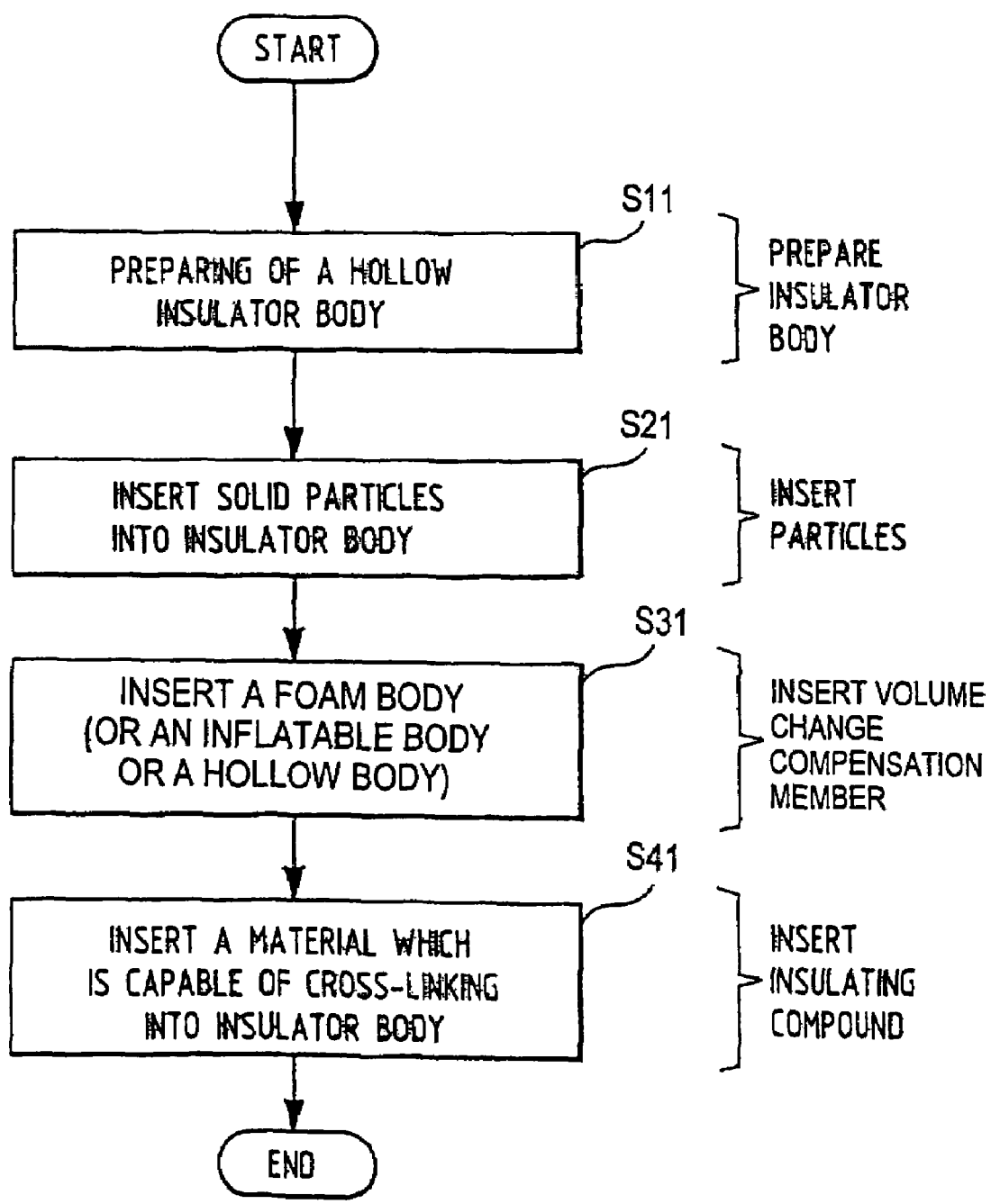
FIG. 10 shows a schematic flow chart of a second exemplary embodiment of a method of building a termination of an electrical cable in accordance with the present invention.

FIG. 10 shows a second embodiment of the method of building a termination of an electrical cable in accordance with the invention.

Particularly FIG. 10 shows a second embodiment of the method of building a termination as described with reference to FIG. 3 and 8. The particular features of said embodiments are that the volume change compensation member 13 is located in the upper area of the termination near the connector stalk and that the volume change compensation member 13 remains in the termination for normal use.

The procedure starts at step S11, which is identical to step S1 of the procedure shown in FIG. 9.

In a second step S21, solid particles 3.1 are filled into the insulator body 2 from the upper portion of the termination. For example a filling of about 90% of the interior of the insulator body 2 is carried out and a predetermined space is left free at the upper portion of the insulator body 2. In case the insulating material does not foresee a solid filler, i.e. the solid particles, this step is omitted.

In a third step S31, a volume change compensation member 13 (for example a foam body, an inflatable body or a compressible body) is introduced into the insulator body 2 from above, occupying a certain volume of the upper portion of the insulator body 2, and the termination is closed at its upper end, for example by an upper plate 10.

In a fourth step S41, the insulating compound 3.2 is filled into the insulator body 2 via the connector 20.1 until the inner space of the termination is approximately totally filled.

After this, the termination is closed at its upper end by the upper metal work 10 and the procedure ends.

THIRD EMBODIMENT OF A METHOD TO BUILD A TERMINATION

FIG. 11 shows a third embodiment of a method of building a termination of an electrical cable in accordance with the invention.

Particularly FIG. 11 shows a third embodiment of the method of building a termination as described with reference to FIG. 4.

The procedure starts at step S12, in which the lower plate 11 and the high voltage cable CA are fitted together so that the lower plate 11 receives the high voltage cable CA at its lower end. A volume change compensation member 13 in the form of compressible bodies is provided inside of the lower plate 11 and successively covered with a cover member 15.

In a second step S22 an insulator body 2, with the parts as shown in FIG. 4 necessary for the electrical functioning of the outdoor termination, is prepared so that the high voltage cable CA is provided inside the insulator body 2, wherein the compressible bodies are provided in the bottom area of the termination. In case the insulating material comprises a solid filler, depending on the nature of such filler said cover member 15 can be omitted as the filler keeps the compressible bodies in place while the termination will be filled with insulating compound. The lower plate 11 is coupled to the insulator body 2 and sealed by a gasket 14.

In a third step S32, solid particles 3.1 are filled into the insulator body 2 from the top of the termination, the latter being successively closed at its upper end, for example by means of the upper plate 10. In case the insulating material does not foresee a solid filler, the step of filling in the solid particles can be omitted.

In a fourth step S42, the insulating compound 3.2 is filled into the insulator body 2 via the connector 20.1 until the inner space of the termination is approximately totally filled.

Finally the termination is closed at its upper end by the upper plate 10.

It may be noted that although in this third method embodiment the volume change compensation member 13 is fitted before the insulator body has been prepared, the invention is not restricted to said steps sequence. If the prepared insulator body 2 allows fitting a cover member 15 or if such cover member 15 is not necessary because of using solid insulator particles above the compressible bodies which prevent the latters from leaving the bottom area of the termination during the filling process of the insulating compound, the first step of that method may be similar to the steps S1 and S12 of the first and second embodiment of said method. In such case, before the insertion of the solid insulating particles, the compressible bodies are filled into the insulator body 2.

Furthermore, it should be noted that the invention is not restricted to the above description of the best modes of the invention as presently conceived by the inventors. That is, various variations and modifications of the invention may be carried out on the basis of the above teachings. In particular, the invention may comprise embodiments, which result from the combination of features which have been individually and separately described and claimed in the description, the figures and the claims.

What is claimed is:

1. A termination of an electrical cable comprising:
   an outer insulator body member;
   a substantially longitudinally extended interior member comprising said electrical cable to be terminated, said cable comprising a conductor for carrying load;
   an insulating material filled in a cavity between said outer insulator body and said interior member; and
   means for accommodating the volume expansions of said insulating material within said cavity;
   said means for accommodating the volume expansions of said insulating material comprising:
   a foam body as a volume change compensation member having a predetermined volume to ensure the accommodation of said volume expansions, said volume change compensation member being located in said cavity in an area of non-critical electrical field.

2. The termination according to claim 1, wherein said hollow body comprises a plurality of compressible elements each having an outer skin and a compressible interior space.

3. The termination according to claim 2, wherein said compressible interior space is filled with gas.

4. A termination of an electrical cable comprising:
   an outer insulator body member;
   a substantially longitudinally extended interior member comprising said electrical cable to be terminated, said cable comprising a conductor for carrying load;
   an insulating material filled in a cavity between said outer insulator body and said interior member; and
   means for accommodating the volume expansions of said insulating material within said cavity;
   said means for accommodating the volume expansions of said insulating material comprising:
   an inflatable body as a volume change compensation structural member having a predetermined volume to ensure the accommodation of said volume expansions, said volume change compensation structural member being located in said cavity in an area of non-critical electrical field.

5. The termination according to claim 4, wherein said inflatable body comprises a flexible skin which is blown up with gas.

6. The termination according to claim 5, wherein the material of said skin is made of electrically insulating or semi-conducting material.

7. A method of building a termination of an electrical cable wherein said termination comprises an outer insulator body; a substantially longitudinally extended interior member comprising said electrical cable to be terminated, said cable comprising a conductor for carrying load; an insulating material filled in a cavity between said outer insulator body and said interior member; and means for accommodating the volume expansions of said insulating material within said cavity,
   the method comprising the steps of:
   creating said cavity by introducing said interior member into said outer insulator body;
   filling said insulating material into said cavity;
   sealing said termination; and
   placing a volume change compensation structural member into said cavity to maintain a compensating volume in said cavity in an area of non-critical electrical field as said insulating material is introduced into said cavity, said volume change compensation structural member having a predetermined volume to accommodate volume expansions of said insulating material within said cavity.

8. The method according to claim 7, wherein the step of placing the volume change compensation member into the cavity is performed before the step of filling in the insulating material.

9. The method according to claim 7, wherein the step of filling said insulating material into said cavity comprises the steps of filling an insulating filler and an insulating compound.

10. The method according to claim 9, wherein the step of placing said volume change compensation member is carried out after the step of filling said insulating filler.

11. The method according to claim 7, further comprising the step of selecting the predetermined volume of the volume change compensation member depending on the temperature of the insulating material.

12. The method according to claim 7, further comprising the step of selecting the predetermined volume of the volume change compensation member depending on the ambient temperature range of the area where said termination has to be installed.

13. The method according to claim 7, further comprising the step of removing the volume change compensation member after the step of filling said insulating material into said cavity.

14. A termination of an electrical cable comprising:
an outer insulator body member;
a substantially longitudinally extended interior member comprising said electrical cable to be terminated, said cable comprising a conductor for carrying load;
an insulating material filled in a cavity between said outer insulator body and said interior member; and
means for accommodating the volume expansions of said insulating material within said cavity;
said means for accommodating the volume expansions of said insulating material comprising:
a volume change compensation structural member having a predetermined volume to ensure the accommodation of said volume expansions, said volume change compensation structural member being located in said cavity in an area of non-critical electrical field.

15. The termination according to claim 14, wherein said volume change compensation member compensates the volume expansions of said insulating material by changing its own volume.

16. The termination according to claim 14, wherein said volume change compensation member is placed in the upper part of said termination.

17. The termination according to claim 14, further comprising means for controlling electrical stress concentrations.

18. A termination of an electrical cable comprising:
an outer insulator body member;
a substantially longitudinally extended interior member comprising said electrical cable to be terminated, said cable comprising a conductor for carrying load;
an insulating material filled in a cavity between said outer insulator body and said interior member; and
means for accommodating the volume expansions of said insulating material within said cavity;
said means for accommodating the volume expansions of said insulating material comprising:
a hollow body as a volume change compensation structural member having a predetermined volume to ensure the accommodation of said volume expansions, said volume change compensation structural member being located in said cavity in an area of non-critical electrical field.

19. The termination according to claim 18, wherein said foam body contains material that is electrically insulating or semi-conducting.

20. The termination according to claim 18, wherein said foam body contains closed cell material.

21. The termination according to claim 18, wherein said foam body contains encapsulated chemicals.

22. The termination according to claim 18, wherein said foam body contains water absorbing materials.

23. A termination of an electrical cable comprising:
an outer insulator body member;
a substantially longitudinally extended interior member comprising said electrical cable to be terminated, said cable comprising a conductor for carrying load;
an insulating material filled in a cavity between said outer insulator body and said interior member; and
means for accommodating the volume expansions of said insulating material within said cavity;
said means for accommodating the volume expansions of said insulating material comprising:
a compressible body as a volume change compensation structural member having a predetermined volume to ensure the accommodation of said volume expansions, said volume change compensation structural member being located in said cavity in an area of non-critical electrical field.

24. A method of building a termination of an electrical cable wherein said termination comprises an outer insulator body; a substantially longitudinally extended interior member comprising said electrical cable to be terminated, said cable comprising a conductor for carrying load; an insulating material filled in a cavity between said outer insulator body and said interior member; and means for accommodating the volume expansions of said insulating material within said cavity,
the method comprising the steps of:
creating said cavity by introducing said interior member into said outer insulator body;
filling said insulating material into said cavity;
sealing said termination; and
placing a solid body as a volume change compensation member into said cavity to maintain a compensating volume in said cavity in an area of non-critical electrical field as said insulating material is introduced into said cavity, said volume change compensation member having a predetermined volume to accommodate volume expansions of said insulating material within said cavity.

25. A method of building a termination of an electrical cable wherein said termination comprises an outer insulator body; a substantially longitudinally extended interior member comprising said electrical cable to be terminated, said cable comprising a conductor for carrying load; an insulating material filled in a cavity between said outer insulator body and said interior member; and means for accommodating the volume expansions of said insulating material within said cavity,
the method comprising the steps of:
creating said cavity by introducing said interior member into said outer insulator body;
filling said insulating material into said cavity;
sealing said termination; and
placing a foam body as a volume change compensation member into said cavity to maintain a compensating volume in said cavity in an area of non-critical electrical field as said insulating material is introduced into said cavity, said volume change compensation member having a predetermined volume to accommodate volume expansions of said insulating material within said cavity.

26. A method of building a termination of an electrical cable wherein said termination comprises an outer insulator body; a substantially longitudinally extended interior member comprising said electrical cable to be terminated, said cable comprising a conductor for carrying load; an insulating material filled in a cavity between said outer insulator body and said interior member; and means for accommodating the volume expansions of said insulating material within said cavity,
the method comprising the steps of:
creating said cavity by introducing said interior member into said outer insulator body;
filling said insulating material into said cavity;

sealing said termination; and placing a hollow body as a volume change compensation structural member into said cavity to maintain a compensating volume in said cavity in an area of non-critical electrical field as said insulating material is introduced into said cavity, said volume change compensation structural member having a predetermined volume to accommodate volume expansions of said insulating material within said cavity.

27. A method of building a termination of an electrical cable wherein said termination comprises an outer insulator body; a substantially longitudinally extended interior member comprising said electrical cable to be terminated, said cable comprising a conductor for carrying load; an insulating material filled in a cavity between said outer insulator body and said interior member; and means for accommodating the volume expansions of said insulating material within said cavity, the method comprising the steps of:

creating said cavity by introducing said interior member into said outer insulator body;

filling said insulating material into said cavity;

sealing said termination; and placing a compressible body as a volume change compensation structural member into said cavity to maintain a compensating volume in said cavity in an area of non-critical electrical field as said insulating material is introduced into said cavity, said volume change compensation structural member having a predetermined volume to accommodate volume expansions of said insulating material within said cavity.

28. A method of building a termination of an electrical cable wherein said termination comprises an outer insulator body; a substantially longitudinally extended interior member comprising said electrical cable to be terminated, said cable comprising a conductor for carrying load; an insulating material filled in a cavity between said outer insulator body and said interior member; and means for accommodating the volume expansions of said insulating material within said cavity, the method comprising the steps of:

creating said cavity by introducing said interior member into said outer insulator body;

filling said insulating material into said cavity;

sealing said termination; and placing an inflatable body as a volume change compensation structural member into said cavity to maintain a compensating volume in said cavity in an area on non-critical electrical field as said insulating material is introduced into said cavity, said volume change compensation structural member having a predetermined volume to accommodate volume expansions of said insulating material within said cavity.

29. A termination of an electrical cable comprising:

an outer insulator body member;

a substantially longitudinally extended interior member comprising said electrical cable to be terminated, said cable comprising a conductor for carrying load;

an insulating material filled in a cavity between said outer insulator body and said interior member; and means for accommodating the volume expansions of said insulating material within said cavity;

said means for accommodating the volume expansions of said insulating material comprising:

a solid body as a volume change compensation member having a predetermined volume to ensure the accommodation of said volume expansions, said volume change compensation member being located in said cavity in an area of non-critical electrical field.

30. A method of building a termination of an electrical cable wherein said termination comprises an outer insulator body; a substantially longitudinally extended interior member comprising said electrical cable to be terminated, said cable comprising a conductor for carrying load; an insulating material filled in a cavity between said outer insulator body and said Interior member; and a compensating volume for accommodating the volume expansions of said insulating material within said cavity, the method comprising the steps of:

creating said cavity by introducing said interior member into said outer insulator body;

filling said insulating material into said cavity;

sealing said termination;

placing a volume change compensation structural member into said cavity, said volume change compensation structural member having a predetermined volume to accommodate volume expansions of said insulating material within said cavity; and removing said volume change compensation structural member after filling said insulation material into said cavity.

* * * * *